US010613906B2

(12) United States Patent
Rodriguez Bravo et al.

(10) Patent No.: US 10,613,906 B2
(45) Date of Patent: Apr. 7, 2020

(54) SHARED HARDWARE AND SOFTWARE RESOURCE REPLACEMENT

(71) Applicant: INTERNATIONAL BUSINESS MACHINES CORPORATION, Armonk, NY (US)

(72) Inventors: Cesar Augusto Rodriguez Bravo, Alajuela (CR); Jose Cano Zapata, Mercedes Norte (CR); Edgar Adolfo Zamora Duran, Heredia (CR)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 15/815,926

(22) Filed: Nov. 17, 2017

(65) Prior Publication Data

US 2019/0155659 A1    May 23, 2019

(51) Int. Cl.
*G06F 9/50*       (2006.01)
*H04L 29/08*     (2006.01)
(Continued)

(52) U.S. Cl.
CPC .......... *G06F 9/5077* (2013.01); *G06F 9/4411* (2013.01); *H04L 47/827* (2013.01);
(Continued)

(58) Field of Classification Search
CPC ......... G06F 9/5077; G06F 2009/45595; H04L 47/827; H04L 67/16; H04L 67/42; H04L 67/303
(Continued)

(56) References Cited

U.S. PATENT DOCUMENTS 8,131,849 B2 * 3/2012 Narasimhan .......... H04L 41/046
                                                                709/223
8,250,166 B1 * 8/2012 Barnes ................ G06F 11/2023
                                                                709/213
(Continued)

FOREIGN PATENT DOCUMENTS

JP      2016526310       9/2016

OTHER PUBLICATIONS

Lysis Platform; Introducing the Ultimate Platform of the Social Internet of Things; URL: http://www.lysis-iot.com/; retrieved from the Internet Feb. 16, 2017; 3 pages.
(Continued)

*Primary Examiner* — Nicholas R Taylor
*Assistant Examiner* — Chong G Kim
(74) *Attorney, Agent, or Firm* — Schmeiser, Olsen & Watts; Mark C. Vallone

(57) ABSTRACT

A method and system for improving shared hardware and software resource system is provided. The method includes detecting and registering an Internet of things (IOT) device connected to a network. Hardware/software resources and sensors associated with hardware and software operations executed by the IOT device are identified and all available data and associated metadata associated with the hardware/software resources and the sensors are stored in a database. Additional available hardware/software resources and sensors associated with a plurality of IOT devices connected to the network are displayed and a command signal for assigning a specified hardware/software resource or sensor to the IOT device is executed. A network identification code associated with a location of the specified hardware/software resource or sensor is retrieved and enabled with respect to said IOT device.

13 Claims, 12 Drawing Sheets

(51) Int. Cl.
*H04L 12/911* (2013.01)
*H04L 29/06* (2006.01)
*G06F 9/4401* (2018.01)
*G06F 9/455* (2018.01)
*G06F 8/60* (2018.01)

(52) U.S. Cl.
CPC .............. *H04L 67/16* (2013.01); *H04L 67/36* (2013.01); *H04L 67/42* (2013.01); *G06F 8/60* (2013.01); *G06F 2009/45595* (2013.01); *H04L 67/303* (2013.01)

(58) Field of Classification Search
USPC ........................................................ 709/226
See application file for complete search history.

(56) References Cited

U.S. PATENT DOCUMENTS

| | | | |
|---|---|---|---|
| 9,292,832 | B2 | 3/2016 | Goel et al. |
| 2002/0120744 | A1 | 8/2002 | Chellis et al. |
| 2002/0191539 | A1 | 12/2002 | Rawlins et al. |
| 2004/0010437 | A1 | 1/2004 | Kiran et al. |
| 2005/0066218 | A1* | 3/2005 | Stachura ............. G06F 11/2028 714/3 |
| 2006/0242285 | A1* | 10/2006 | Moriwaki ............... H04L 67/12 709/223 |
| 2007/0198675 | A1* | 8/2007 | Amanuddin ........... G08B 25/10 709/223 |
| 2008/0250137 | A1* | 10/2008 | Zufelt ................. H04L 41/0663 709/224 |
| 2011/0055907 | A1* | 3/2011 | Narasimhan .......... H04L 41/046 726/5 |
| 2014/0075022 | A1* | 3/2014 | Narasimhan .......... H04L 41/046 709/224 |
| 2014/0324973 | A1 | 10/2014 | Goel et al. |
| 2015/0296043 | A1 | 10/2015 | Kim et al. |
| 2016/0050264 | A1* | 2/2016 | Breed ................. G08B 25/006 709/217 |
| 2016/0085594 | A1 | 3/2016 | Wang et al. |
| 2016/0098309 | A1* | 4/2016 | Kim ................... G06F 11/0709 714/47.1 |
| 2017/0063605 | A1* | 3/2017 | Cheng ................. H04L 41/0668 |
| 2017/0105131 | A1* | 4/2017 | Song ....................... H04W 4/70 |
| 2017/0346694 | A1* | 11/2017 | Buendgen ........... H04L 41/0856 |
| 2018/0285234 | A1* | 10/2018 | Degaonkar ......... G06F 11/3476 |
| 2018/0351792 | A1* | 12/2018 | Hunter ................ H04L 41/0853 |
| 2018/0351793 | A1* | 12/2018 | Hunter ................ H04L 41/082 |
| 2019/0090305 | A1* | 3/2019 | Hunter ................ H04W 84/04 |

OTHER PUBLICATIONS

Ko, JeongGil; et al.; Sensor Virtualization Module: Virtualizing IoT Devices of Mobile Smartphones for Effective Sensor Data Management; SAGE journals; Internation Journal of distributed Sensor Networks; Jan. 1, 2015; 21 pages.

Kliem, Andreas et al.; The Internet of Things Resource Management Challenge; 2015 IEEE International Conference on Data Science and Data Intensive Systems; Dec. 11-13, 2015; 3 pages.

* cited by examiner

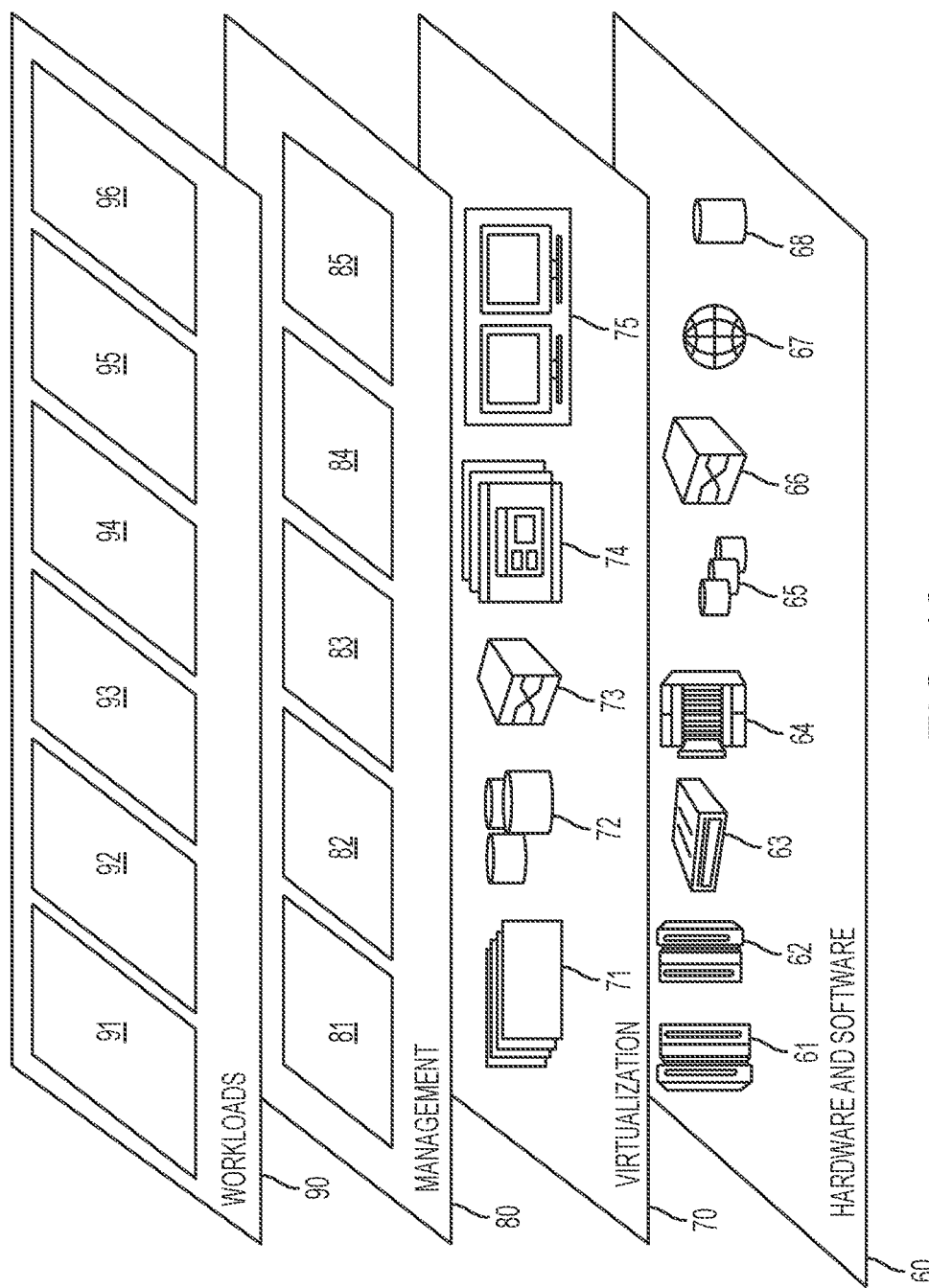

SHARED HARDWARE AND SOFTWARE RESOURCE REPLACEMENT

FIELD

The present invention relates generally to a method for automatically sharing hardware and software resources and in particular to a method and associated system for improving Internet device technology associated with sharing hardware and software resources and sensors between devices based on information retrieved via multiple hardware sensors of the devices.

BACKGROUND

Accurately detecting device component malfunctions typically includes an inaccurate process with little flexibility. Determining malfunction solutions with respect to recovering device functions may include a complicated process that may be time consuming and require a large amount of resources. Accordingly, there exists a need in the art to overcome at least some of the deficiencies and limitations described herein above.

SUMMARY

A first aspect of the invention provides a shared hardware and software resource improvement method comprising: detecting, by a processor of a hardware device executing a network registration circuit, an Internet of things device connected to a network; registering, by said processor, the Internet of things device with said network; identifying, by the processor, hardware/software resources and sensors associated with hardware and software operations executed by the Internet of things device; identifying, by the processor, a performance level associated with each of the hardware/software resources and sensors; storing, by the processor within a database, all available data and associated metadata associated with the hardware/software resources and the sensors; displaying, by the processor via a graphical user interface, additional available hardware/software resources and sensors associated with a plurality of Internet of things devices connected to the network; executing, by the processor, a command signal for assigning a specified hardware/software resource or sensor, of the additional available hardware/software resources and sensors, to the Internet of things device; retrieving, by the processor, a network identification code associated with a location of the specified hardware/software resource or sensor; and enabling, by the processor via the network identification code, the specified hardware/software resource or sensor with respect to the Internet of things device.

A second aspect of the invention provides a shared hardware and software failover improvement method comprising: monitoring, by a processor of a hardware device, hardware/software resources and sensors of a plurality of Internet of things devices; determining, by the processor based on results of the monitoring, a currently malfunctioning hardware/software resource or sensor of an Internet of things device of the plurality of Internet of things devices; identifying, by the processor in response to the determining, compatible available hardware/software resources or sensors of the plurality of Internet of things devices; triggering, by the processor, an alert indicating the currently malfunctioning hardware/software resource or sensor; and presenting, by the processor via a graphical user interface, available options for replacing the currently malfunctioning hardware/software resource or sensor with a compatible available hardware/software resource or sensor of the compatible available hardware/software resources or sensors.

A third aspect of the invention provides computer program product, comprising a computer readable hardware storage device storing a computer readable program code, the computer readable program code comprising an algorithm that when executed by a processor of a hardware device implements a shared hardware and software resource improvement method, the method comprising: detecting, by the processor executing a network registration circuit, an Internet of things device connected to a network; registering, by the processor, the Internet of things device with the network; identifying, by the processor, hardware/software resources and sensors associated with hardware and software operations executed by the Internet of things device; identifying, by the processor, a performance level associated with each of the hardware/software resources and sensors; storing, by the processor within a database, all available data and associated metadata associated with the hardware/software resources and the sensors; displaying, by the processor via a graphical user interface, additional available hardware/software resources and sensors associated with a plurality of Internet of things devices connected to the network; executing, by the processor, a command signal for assigning a specified hardware/software resource or sensor, of the additional available hardware/software resources and sensors, to the Internet of things device; retrieving, by the processor, a network identification code associated with a location of the specified hardware/software resource or sensor; and enabling, by the processor via the network identification code, the specified hardware/software resource or sensor with respect to the Internet of things device.

The present invention advantageously provides a simple method and associated system capable of accurately detecting device component malfunctions.

BRIEF DESCRIPTION OF THE DRAWINGS

FIG. 12 illustrates a set of functional abstraction layers provided by cloud computing environment, in accordance with embodiments of the present invention.

DETAILED DESCRIPTION

Figure 1:
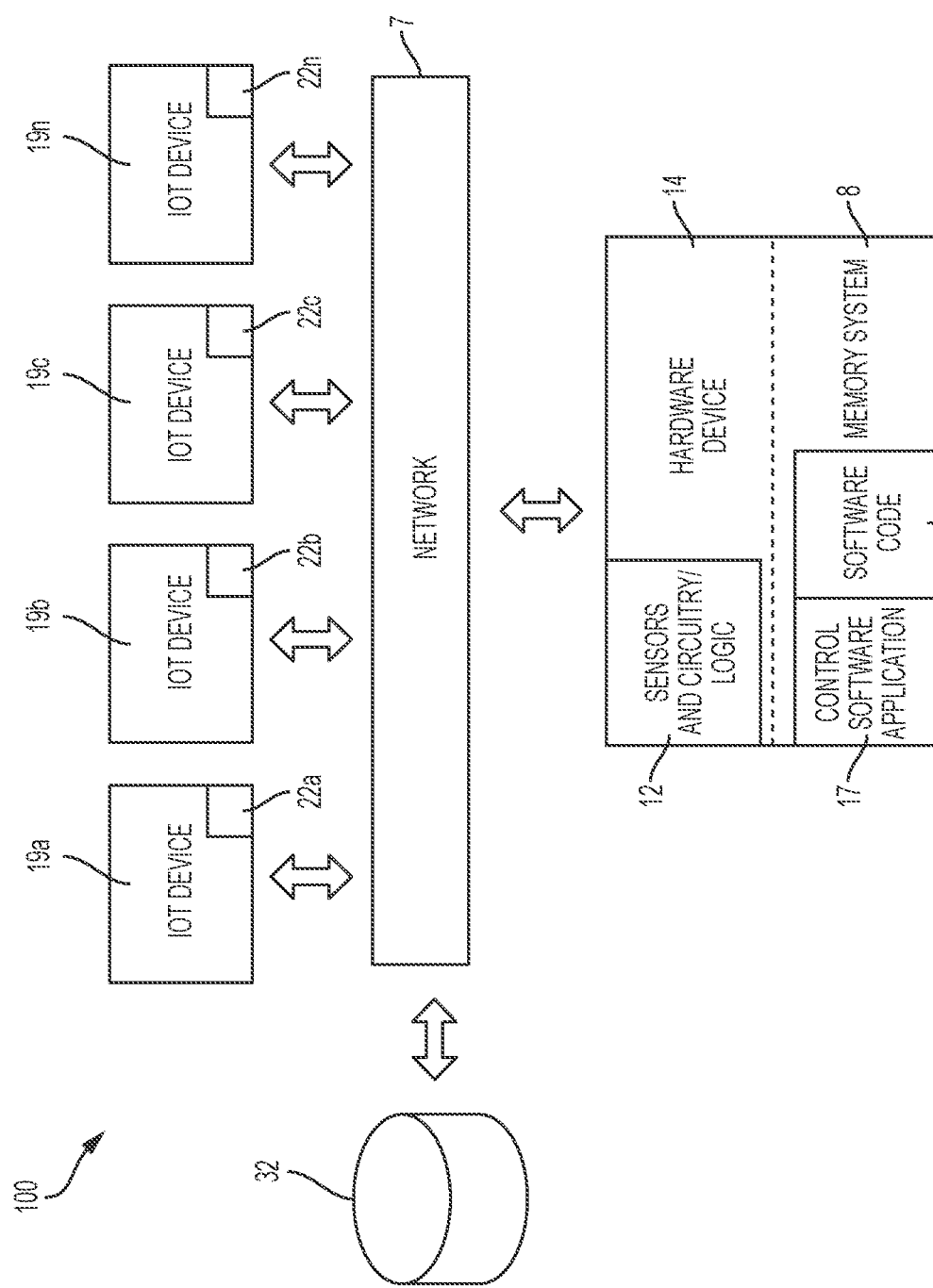
FIG. 1 illustrates a system for improving Internet device technology associated with sharing hardware and software resources and sensors between Internet of things (IoT) devices based on information retrieved via multiple hardware sensors of the IOT devices, in accordance with embodiments of the present invention.

FIG. 1 illustrates a system 100 for improving Internet device technology associated with sharing hardware and software resources and sensors 22a . . . 22n between Internet of things (IoT) devices 19a . . . 19n based on information retrieved via hardware and software resources and sensors 22a . . . 22n of the IOT devices 19a . . . 19n, in accordance with embodiments of the present invention. System 100 is enabled to share sensors resources between IoT devices 19a . . . 19n by creating a pool of IoT devices such that additional IoT devices 19a . . . 19n (connected to a same network) may obtain additional hardware/software resource and/or sensor assigned intelligently via a centralized component (e.g., hardware device 14) in accordance with a learned criteria such as, inter alia, a resource type, resource performance, specified device locations, etc. Additionally, system 100 enables auto-recovery functionality for faulty sensors on an IoT network. For example, auto-recovery functionality may be enabled with respect to detection of sensor errors. System 100 enables the following process for sharing hardware and software resources and sensors between Internet of things (IoT) devices:

The process is initiated when an IoT device connected to and registered with an IoT network. The registration process results in all IoT device sensors being listed and added to a pool of resources such that all IoT devices on the IoT network may access and connect to the resources within the pool of resources. A monitoring process is executed. The monitoring process includes monitoring a status of all sensors (of the IoT devices) on the IoT network. If a sensor failure is detected, system 100 automatically executes a search for a similar sensor within the pool of resources to allow the IoT device to function in a normal state. Additionally, notifications may be provided to a user.

System 100 of FIG. 1 includes IoT devices 19a . . . 19n and a database system 32 connected through an IoT network 7 to a hardware device 14. Hardware device 14 comprises sensors and circuitry/logic 12 and a (specialized) memory system 8. Memory system 8 comprises a control software application 17 and software code 28. Memory system 8 may include a single memory system. Alternatively, memory system 8 may include a plurality of memory systems. IoT devices 19a . . . 19n comprise hardware/software resources and sensors 22a . . . 22n, respectively. IoT devices 19a . . . 19n, database system 32, and hardware device 14 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, IoT devices 19a . . . 19n, database system 32, and hardware device 14 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-12. The specialized discrete non-generic analog, digital, and logic based circuitry (e.g., sensors and circuitry/logic 12, hardware/software resources and sensors 22a . . . 22n, etc.) may include proprietary specially designed components (e.g., a specialized integrated circuit, such as for example an Application Specific Integrated Circuit (ASIC) designed for only implementing a process for improving Internet device technology associated with sharing hardware and software resources and sensors between Internet of things (IoT) devices based on information retrieved via multiple hardware sensors of the IOT devices. Sensors and circuitry/logic 12, hardware/software resources and sensors 22a . . . 22n may include, inter alia, light detection sensors, audio sensors; GPS sensors, optical sensors, temperature sensors, pressure sensors, voltage sensors, optical sensors, gas sensors, proximity sensors, vibration sensors, motion sensors, laser sensors, water sensors, fingerprint sensors, heart rate sensors, solar sensors, NFC sensors, RFID sensors, Infrared sensors, an accelerometer sensor, etc. Likewise resources of hardware/software resources and sensors 22a . . . 22n may include, inter alia, Bluetooth resources, WiFi resources, 3G/4G resources, digital storage resources, facial recognition resources, voice recognition resources, camera resources, power resources, etc. IoT network 7 may include any type of network including, inter alia, a local area network (LAN), a wide area network (WAN), the Internet, a wireless network, etc.

System 100 enables the following implementation example for sharing hardware/software resources:

An IoT network comprises a smart refrigerator (an IoT device) including a global positioning satellite (GPS) system for enabling the automated delivery of food to a user's house. Therefore, all additional IoT devices (on the user's network) may be connected to the GPS system of the smart refrigerator to replace a malfunctioning GPS system of one of the additional IoT devices.

System 100 enables the following process for generating a cognitive pool of shared resources for IoT devices and networks:

1. Sensors associated with an IoT device are added to a pool of resources accessible to additional IoT devices on an associated network in response to adding the IoT device to the network.

2. The resources in pool of resources are distributed between IoT devices via usage of a load balancer to distribute functionality between IOT devices and a cognitive hardware/software component using data from duplicated sensors to identify sensors of the IoT Devices that are associated with associated performance levels.

3. A status of the sensors is monitored and in response to a status of one of the sensors indicating a hardware or software failure, a similar sensor is located in the pool of resources and connected to an associated IoT device to enable the associated IoT device to operate in a normal state.

4. A user of the associated IoT device is notified regarding the sensor status and new sensor connection.

5. The pool of resources is updated automatically with the status of the sensor indicating failure.

Figure 2:
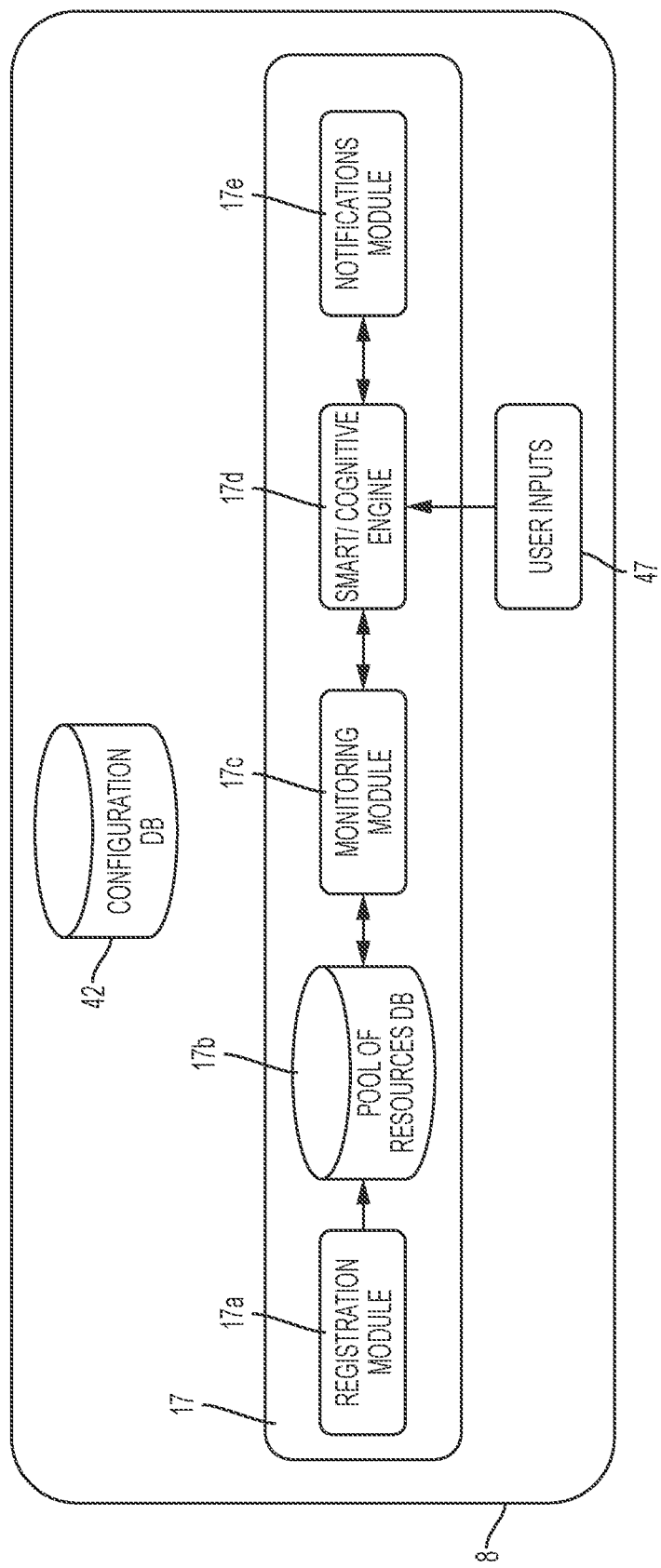
FIG. 2 illustrates an internal view of the memory system of FIG. 1, in accordance with embodiments of the present invention.

FIG. 2 illustrates an internal view of memory system 8 of FIG. 1, in accordance with embodiments of the present invention. Memory system 8 comprises a configuration database 42, control software application 17 (including a registration software module 17a, a pool of resources database 17b, a monitoring module 17c, a smart/cognitive engine 17d, and a notifications module 17e), and user inputs. Configuration database 42 stores all the hardware and software settings associated with system 100. Registration module 17a executes a process for registering all sensors into system 100 and storing the registration information within pool of resources database 17b. Additionally, information indicating all available resources is stored within pool of resources database 17b. Monitoring module 17c is enabled to monitor a status of all the sensors in system 100. If a sensor status change is detected, monitoring module 17c updates pool of resources database 17b accordingly. Smart/cognitive engine 17d comprises three components: a sensor engine component, a cognitive component, and a device recovery component. The sensor engine component enables a smart distribution process of hardware/software resources between IoT devices. The sensor engine includes a load balancer component for distributing work between sensors. The cognitive component analyzes data retrieved from duplicated sensors to determine a highest performance level based on capabilities and characteristics. If duplicate sensors are detected, system 100 will enable best available sensors. The device recovery component automatically detects similar sensors on within a pool of resources and connects a located sensor to a faulty IoT device to keep the faulty IoT device functional. Additionally, the device recovery component is configured to trigger an alert indicating IoT device malfunctioning or error. The notifications module outputs all information to users. The outputs may comprise written communications (e.g., emails, SMS, etc.), visual communications, etc.

Figure 3:
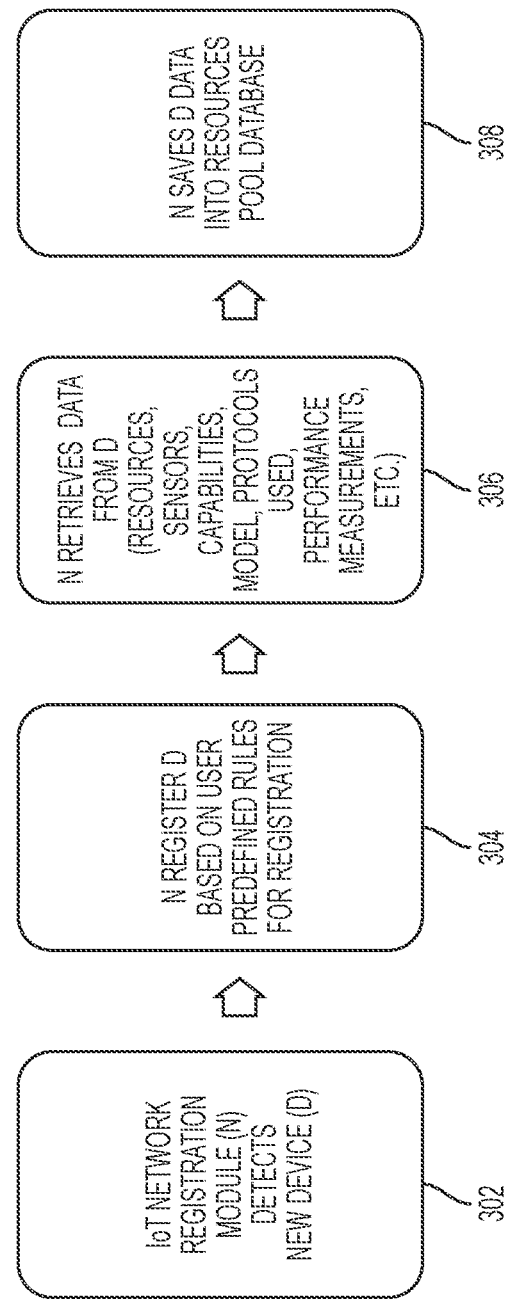
FIG. 3 illustrates an algorithm detailing an IoT device enrollment process enabled by system 100 of FIG. 1, in accordance with embodiments of the present invention.

FIG. 3 illustrates an algorithm detailing an IoT device enrollment process enabled by system 100 of FIG. 1, in accordance with embodiments of the present invention. Each of the steps in the algorithm of FIG. 3 may be enabled and executed in any order by a computer processor(s) executing computer code. Additionally, each of the steps in the algorithm of FIG. 2 may be enabled and executed in combination by hardware device 14 and IoT devices 19a . . . 19n of FIG. 1. In step 302, an IoT network registration module detects a new IoT device for connection to an IoT network. In step 304, the IoT network registration module registers the new IoT device based on user predefined digital rules. In step 306, the IoT network registration module retrieves data from new IoT device. For example the data may include, inter alia, resource identification data, sensor data, capability data, model data, protocol data, performance data, sensor measurement data, etc. In step 308, the data retrieved in step 306 is stored in a resource pool database 17b.

Figure 4:
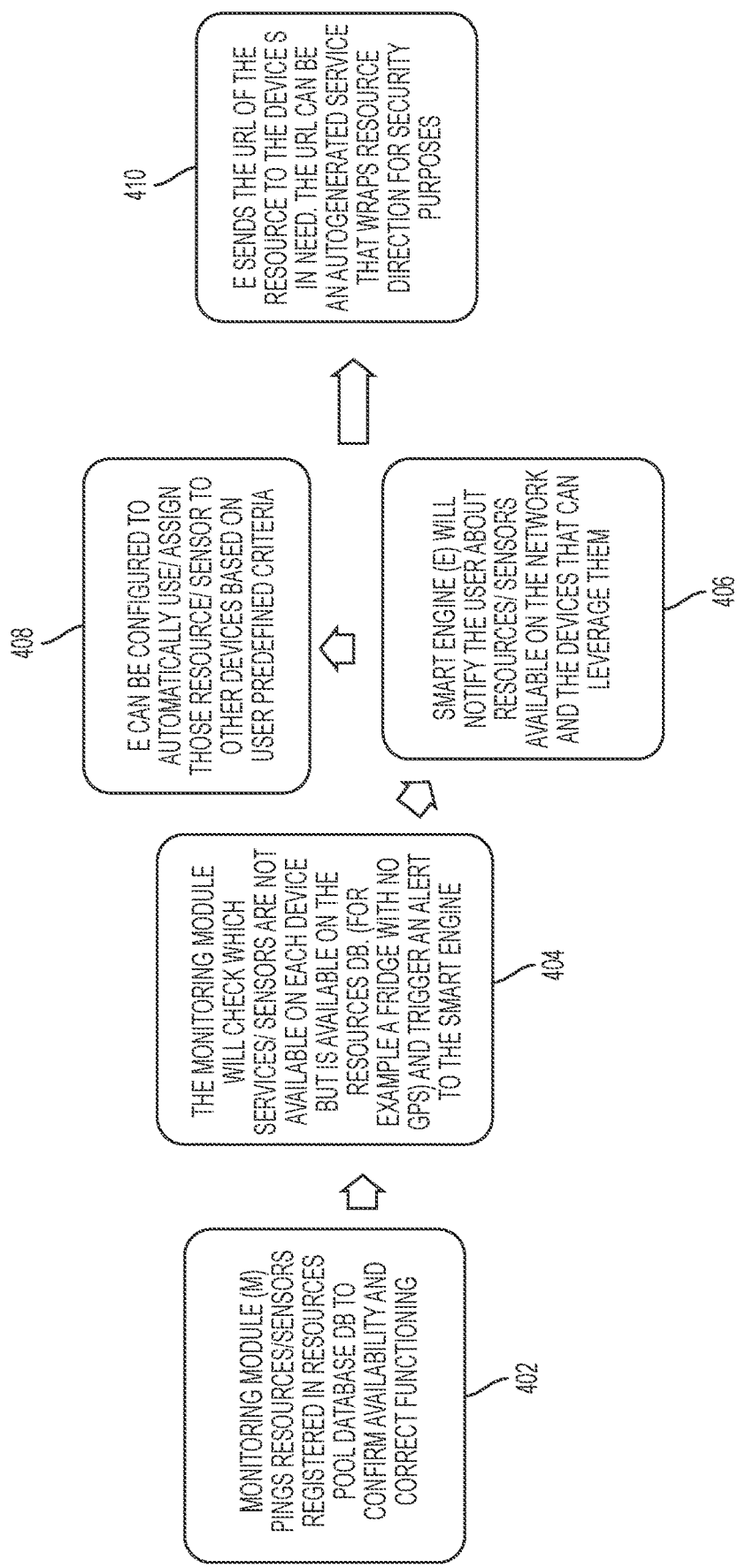
FIG. 4 illustrates an algorithm detailing an IoT device resource sharing process enabled by the system of FIG. 1, in accordance with embodiments of the present invention.

FIG. 4 illustrates an algorithm detailing an IoT device resource sharing process enabled by system 100 of FIG. 1, in accordance with embodiments of the present invention. Each of the steps in the algorithm of FIG. 4 may be enabled and executed in any order by a computer processor(s) executing computer code. Additionally, each of the steps in the algorithm of FIG. 2 may be enabled and executed in combination by hardware device 14 and IoT devices 19a . . . 19n of FIG. 1. In step 402, a monitoring module pings resources and sensors registered in a resources pool database 17b to confirm availability and functionality. In step 404, the monitoring module 17c detects unavailable sensors with respect to each IoT device. The unavailable sensors with respect to each IoT device are additionally determined to be available within the resource database. An associated alert indicating the sensor statuses is generated and transmitted to a smart software engine. In step 406, the smart software engine presents a list of the sensors (and associated IoT devices) determined to be available within the resource database. In step 408, the smart software engine is configured to automatically assign sensors from the list to associated devices requiring sensor replacement. In step 410, the smart software engine transmits a URL of an available resource to an associated IoT device requiring use of the available resource. The URL may comprise an auto-generated structure that wraps a resource direction for security purposes.

Figure 5:
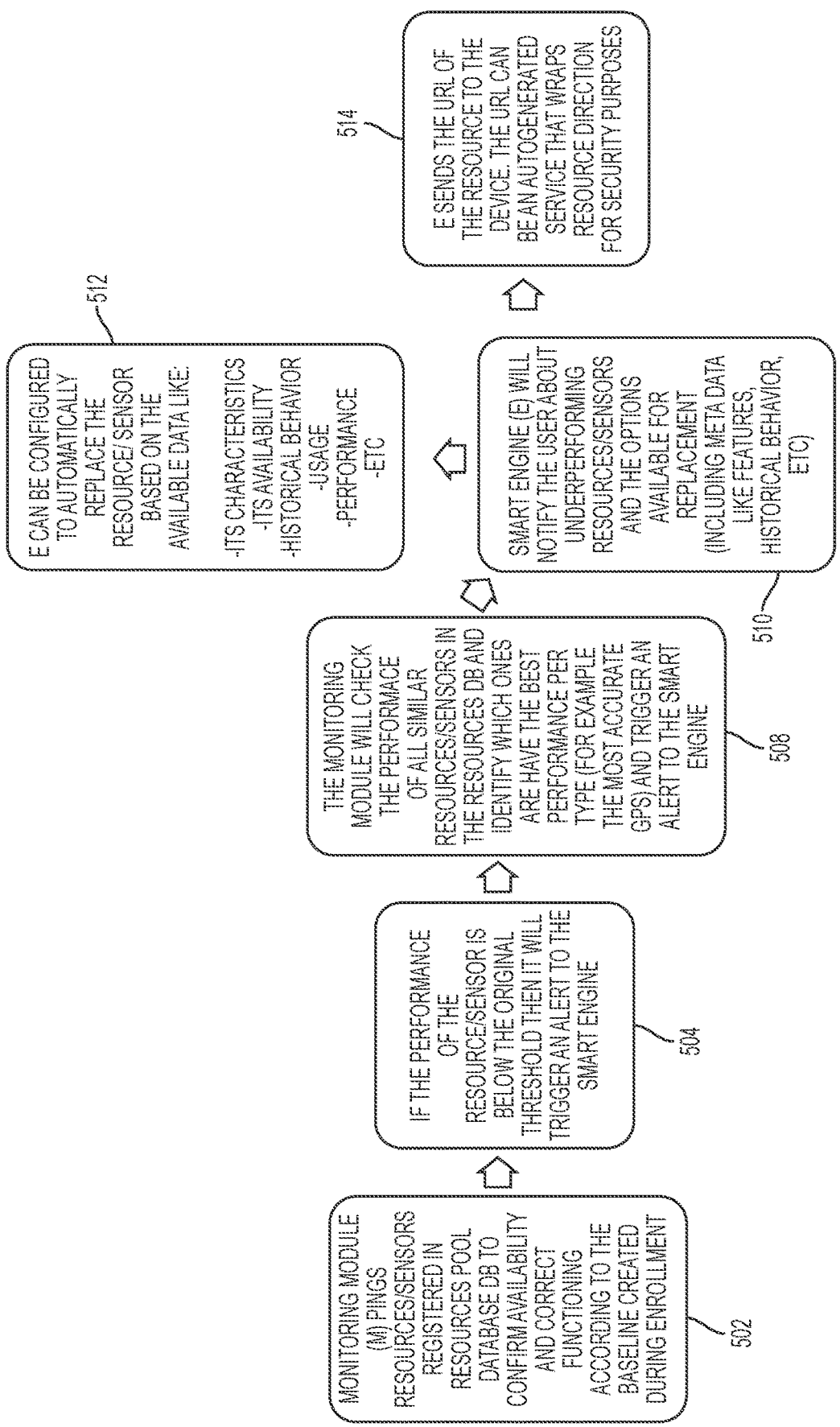
FIG. 5 illustrates an algorithm detailing a first hardware/software resource recommendation process enabled by the system of FIG. 1, in accordance with embodiments of the present invention.

FIG. 5 illustrates an algorithm detailing a first hardware/software resource recommendation process enabled by system 100 of FIG. 1, in accordance with embodiments of the present invention. Each of the steps in the algorithm of FIG. 5 may be enabled and executed in any order by a computer processor(s) executing computer code. Additionally, each of the steps in the algorithm of FIG. 5 may be enabled and executed in combination by hardware device 14 and IoT devices 19a . . . 19n of FIG. 1. In step 502, a monitoring module pings resources and sensors registered in a resources pool database to confirm availability and functionality with respect to an auto-generated baseline. In step 504, it is determined that a performance level of a requested resource and sensor is less than an original threshold value associated with the auto-generated baseline. In step 508, the monitoring module determines a performance level for all similar resources and sensors (i.e., with respect to the requested resource and sensor). The monitoring module identifies (based on the performance levels) a group of the similar resources and sensors comprising the highest performance levels and issues an associated alert for the smart software engine. In step 510, a smart software engine presents a list of under-performing resources and sensors and replacement options. In step 512, the smart software engine is configured to automatically replace a defective sensor based on available data including, inter alia, sensor characteristics, sensor availability, historical sensor behavior, sensor usage, sensor performance, etc. In step 514, the smart software engine transmits a URL of an available resource to an associated IoT device requiring use of the available resource. The URL may comprise an auto-generated structure that wraps a resource direction for security purposes.

Figure 6:
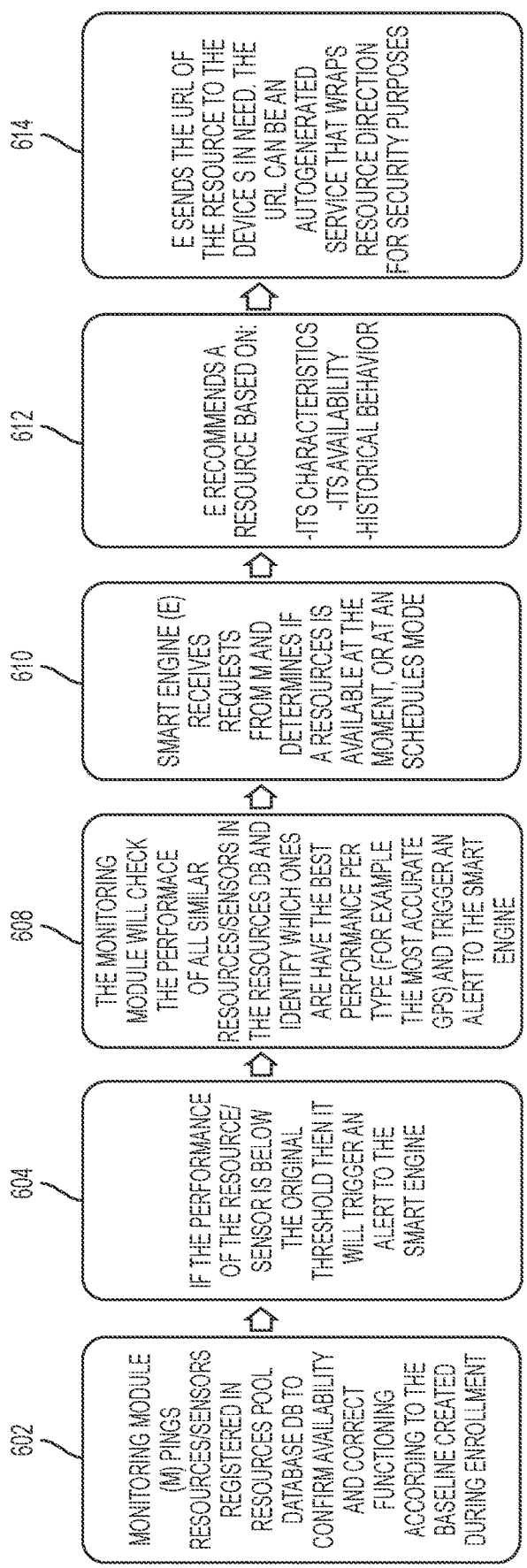
FIG. 6 illustrates an algorithm detailing a second hardware/software resource recommendation process enabled by the system of FIG. 1, in accordance with embodiments of the present invention.

FIG. 6 illustrates an algorithm detailing a second hardware/software resource recommendation process enabled by system 100 of FIG. 1, in accordance with embodiments of the present invention. Each of the steps in the algorithm of FIG. 6 may be enabled and executed in any order by a computer processor(s) executing computer code. Additionally, each of the steps in the algorithm of FIG. 6 may be enabled and executed in combination by hardware device 14 and IoT devices 19a . . . 19n of FIG. 1. In step 602, a monitoring module pings resources and sensors registered in a resources pool database 17b to confirm availability and functionality with respect to an auto-generated baseline. In step 604, it is determined that a performance level of a requested resource and sensor is less than an original threshold value associated with the auto-generated baseline. In step 608, the monitoring module determines a performance level for all similar resources and sensors (i.e., with respect to the requested resource and sensor). The monitoring module identifies (based on the performance levels) a group of the similar resources and sensors comprising the highest performance levels and issues an associated alert for the smart software engine. In step 610, a smart software engine receives requests from the monitoring module and determines if a resource is currently available. In step 612, the smart software engine recommends a resource based on characteristics, availability, and historical behavior. In step 614, the smart software engine transmits a URL of an available resource to an associated IoT device requiring use of the available resource. The URL may comprise an auto-generated structure that wraps a resource direction for security purposes.

Figure 7:
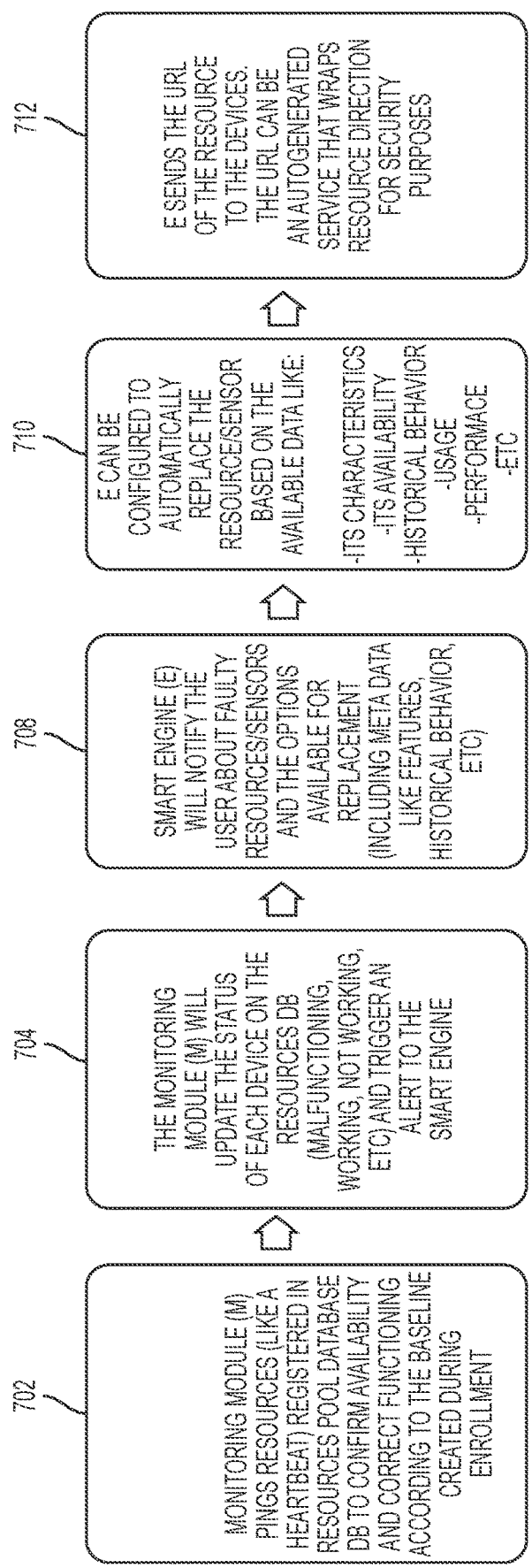
FIG. 7 illustrates an algorithm detailing a resource failure response provisioning process enabled by the system of FIG. 1, in accordance with embodiments of the present invention.

FIG. 7 illustrates an algorithm detailing a resource failure response provisioning process enabled by system 100 of FIG. 1, in accordance with embodiments of the present invention. Each of the steps in the algorithm of FIG. 7 may be enabled and executed in any order by a computer processor(s) executing computer code. Additionally, each of the steps in the algorithm of FIG. 7 may be enabled and executed in combination by hardware device 14 and IoT devices 19a . . . 19n of FIG. 1. In step 702, a monitoring module pings resources and sensors registered in a resources pool database to confirm availability and functionality with respect to an auto-generated baseline. In step 704, the monitoring module updates a status for each IoT device associated with a resource database and triggers an associated alert for a smart software engine. The status may indicate a functional status, a malfunctioning status, etc. In step 708, the smart software engine identifies faulty resources and/or sensors and replacement options. In step 710, the smart software engine is configured to automatically replace a defective sensor based on available data including, inter alia, sensor characteristics, sensor availability, historical sensor behavior, sensor usage, sensor performance, etc. In step 712, the smart software engine transmits a URL of an available resource to an associated IoT device requiring use of the available resource. The URL may comprise an auto-generated structure that wraps a resource direction for security purposes.

Figure 8:
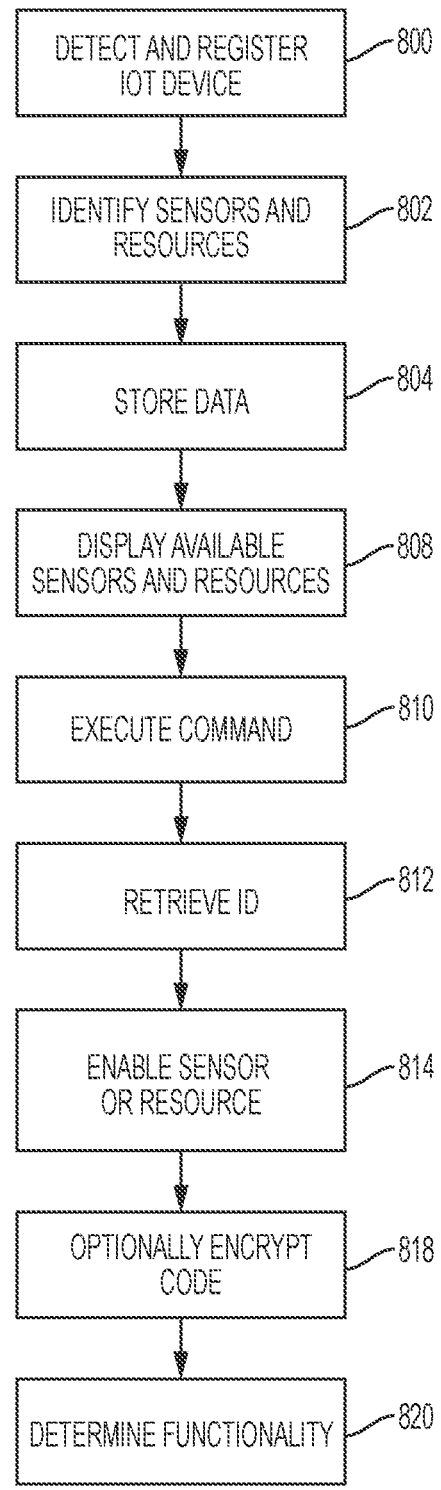
FIG. 8 illustrates an algorithm detailing an Internet device technology improvement associated with sharing hardware and software resources and sensors between IoT devices enabled by the system of FIG. 1, in accordance with embodiments of the present invention.

FIG. 8 illustrates an algorithm detailing an Internet device technology improvement associated with sharing hardware and software resources and sensors between IoT devices enabled by system 100 of FIG. 1, in accordance with embodiments of the present invention. Each of the steps in the algorithm of FIG. 8 may be enabled and executed in any order by a computer processor(s) executing computer code. Additionally, each of the steps in the algorithm of FIG. 8 may be enabled and executed in combination by hardware device 14 and IoT devices 19a . . . 19n of FIG. 1. In step 800, an IoT device connected to a network is detected and registered by a (controller) hardware device executing a network registration circuit. In step 802, hardware/software resources and sensors and associated performance levels are identified. The hardware/software resources and sensors may be identified by execution of a pinging process. The hardware/software resources and sensors are associated with hardware and software operations executed by the Internet of things device. In step 804, all available data and associated metadata associated with the hardware/software resources and sensors is stored within a database. In step 808, additional available hardware/software resources and sensors are displayed via a graphical user interface. The additional available hardware/software resources and sensors are associated with a plurality of Internet of things devices connected to the network. In step 810, a command signal for assigning a specified hardware/software resource or sensor to the Internet of things device is executed. In step 812, a network identification code associated with a location of the specified hardware/software resource or sensor is retrieved. In step 814, the specified hardware/software resource or sensor is enabled (via the network identification code) with respect to the Internet of things device. Enabling the specified hardware/software resource or sensor may include executing software code for automatically assigning the specified hardware/software resource or sensor to the Internet of things device. Alternatively, enabling the specified hardware/software resource or sensor may include:

1. Comparing a performance level of the hardware/software resources and sensors associated with hardware and software operations executed by the Internet of things device to a current operational performance level of additional hardware/software resources and sensors available on the network.
2. Determining that a hardware/software resource or sensor of the additional hardware/software resources and sensors available on said network comprises a performance level exceeding each performance level associated with each hardware/software resource and sensor.
3. Triggering an alert indicating the performance level exceeding each performance level associated with each of the hardware/software resources and sensors.

In step 818, the network identification code is optionally encrypted. In step 820, it is determined that the additional hardware/software resources and additional sensors are operational with respect to a specified threshold.

Figure 9:
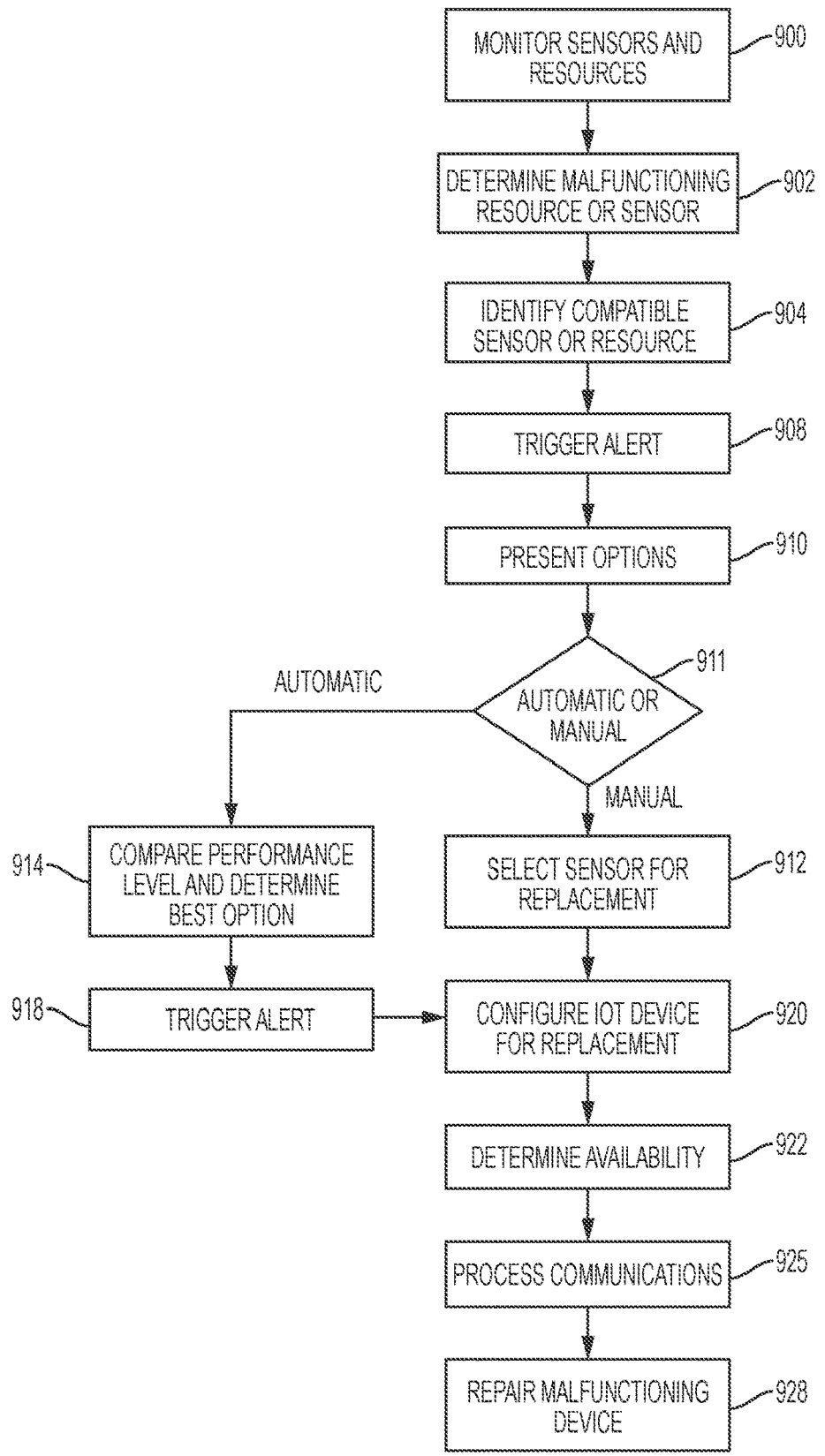
FIG. 9 illustrates an algorithm detailing an Internet device technology improvement associated with providing a failover option enabled by the system of FIG. 1, in accordance with embodiments of the present invention.

FIG. 9 illustrates an algorithm detailing an Internet device technology improvement associated with providing a failover option enabled by system 100 of FIG. 1, in accordance with embodiments of the present invention. Each of the steps in the algorithm of FIG. 9 may be enabled and executed in any order by a computer processor(s) executing computer code. Additionally, each of the steps in the algorithm of FIG. 9 may be enabled and executed in combination by hardware device 14 and IoT devices 19a . . . 19n of FIG. 1. In step 900, hardware/software resources and sensors of a plurality of Internet of things devices are monitored by a hardware and/or software device. In step 902, a currently malfunctioning hardware/software resource or sensor of an Internet of things device of the plurality of Internet of things devices is determined. In step 904, compatible resources or sensors of the plurality of Internet of things devices are identified. In step 908, an alert indicating the currently malfunctioning hardware/software resource or sensor is triggered. In step 910, available options for replacing the currently malfunctioning hardware/software resource or sensor with a compatible available hardware/software resource or sensor of the compatible available hardware/software resources or sensors is presented via a graphical user interface. In step 911, it is determined if the sensor selection process is executed manually or automatically. If in step 911, it is determined if the sensor selection process is executed manually then in step 912, a user assigns a compatible available hardware/software resource or sensor to the Internet of things device to replace the currently malfunctioning hardware/software resource or sensor and step 920 is executed as described, infra. If in step 911, it is determined if the sensor selection process is executed automatically, then in step 914, an operational performance level of the currently malfunctioning hardware/software resource or sensor is compared with the compatible available hardware/software resources or sensors. Additionally, a best hardware/ software resource and or sensor is determined for replacement of the currently malfunctioning hardware/software resource or sensor. In step 918, an associated alert indicating the best hardware/software resource and or sensor is triggered. In step 920, the Internet of things device is automatically configured for replacement of the currently malfunctioning hardware/software resource or sensor with the best hardware/software resource or sensor. In step 922, it is determined that the best hardware/software resource or sensor is currently available. In step 925, communications between the currently malfunctioning hardware/software resource or sensor and the Internet of things device are disabled and communications between the best hardware/software resource or sensor and Internet of things device are enabled. Additionally, it is determined that the compatible available hardware/software resources or sensors are operational with respect to a specified threshold. In step 928, the currently malfunctioning hardware/software resource or sensor is automatically repaired (e.g., via a software repair process).

Figure 10:
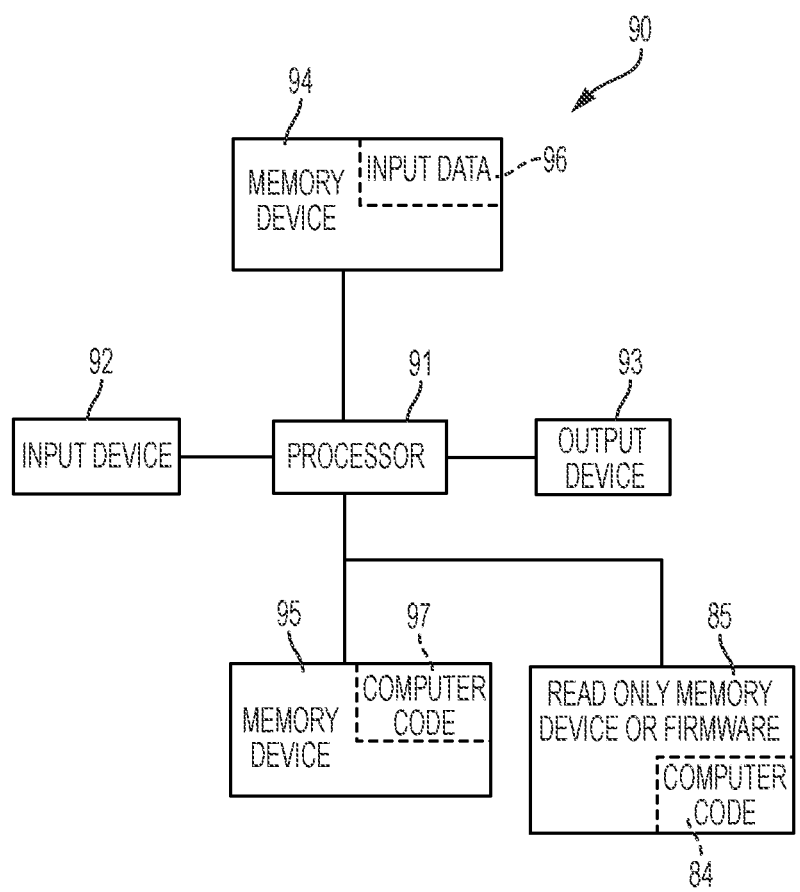
FIG. 10 illustrates a computer system used by or comprised by the system of FIG. 1 for improving Internet device technology associated with sharing hardware and software resources and sensors between Internet of things (IoT) devices based on information retrieved via multiple hardware sensors of the IOT devices, in accordance with embodiments of the present invention.

FIG. 10 illustrates a computer system 90 (e.g., hardware device 14 and IoT devices 19*a* . . . 19*n* of FIG. 1) used by or comprised by the system of FIG. 1 for improving Internet device technology associated with sharing hardware and software resources and sensors between Internet of things (IoT) devices based on information retrieved via multiple hardware sensors of the IOT devices, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 10 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 3-9) for improving Internet device technology associated with sharing hardware and software resources and sensors between Internet of things (IoT) devices based on information retrieved via multiple hardware sensors of the IOT devices. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithms of FIGS. 3-9) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve Internet device technology associated with sharing hardware and software resources and sensors between Internet of things (IoT) devices based on information retrieved via multiple hardware sensors of the IOT devices. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving Internet device technology associated with sharing hardware and software resources and sensors between Internet of things (IoT) devices based on information retrieved via multiple hardware sensors of the IOT devices. In another embodiment, the invention provides a business method that performs the process steps of the invention on a subscription, advertising, and/or fee basis. That is, a service supplier, such as a Solution Integrator, could offer to enable a process for improving Internet device technology associated with sharing hardware and software resources and sensors between Internet of things (IoT) devices based on information retrieved via multiple hardware sensors of the IOT devices. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 10 shows the computer system 90 as a particular configuration of hardware and software, any configuration of hardware and software, as would be known to a person of ordinary skill in the art, may be utilized for the purposes stated supra in conjunction with the particular computer system 90 of FIG. 10. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
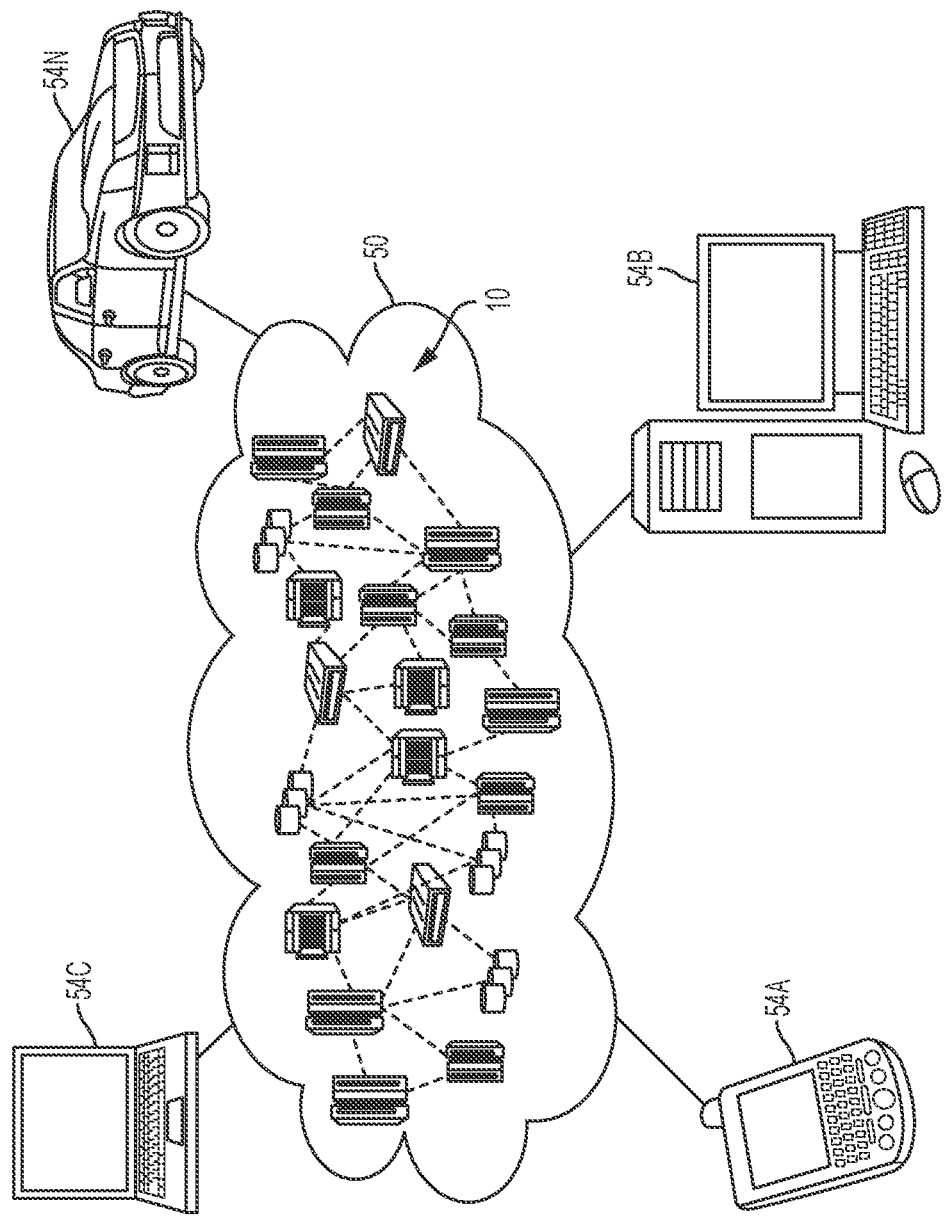
FIG. 11 illustrates a cloud computing environment, in accordance with embodiments of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 11 are intended to be illustrative only and that computing nodes 10 and cloud computing environment 50 can communicate with any type of computerized device over any type of network and/or network addressable connection (e.g., using a web browser).

Referring now to FIG. 12, a set of functional abstraction layers provided by cloud computing environment 50 (see FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving Internet device technology associated with sharing hardware and software resources and sensors between Internet of things (IoT) devices based on information retrieved via multiple hardware sensors of the IOT devices 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A shared hardware and software resource improvement method comprising:
   detecting, by a processor of a hardware device executing a network registration circuit, an Internet of things device connected to a network;
   registering, by said processor, said Internet of things device with said network;
   identifying, by said processor, hardware and software resources and sensors associated with hardware and software operations executed by said Internet of things device;
   identifying, by said processor, a performance level associated with each of said hardware and software resources and sensors;
   storing, by said processor within a database, all available data and associated metadata associated with said hardware and software resources and said sensors;
   detecting, by said processor, an error associated with operation of a first sensor of said hardware and software resources and said sensors, wherein said first sensor is comprised by said Internet of things device;
   displaying, by said processor via a graphical user interface, additional available hardware and software and sensors associated with a plurality of Internet of things devices connected to said network;
   selecting in response to said detecting, by said processor from said graphical user interface, a second sensor of said additional available hardware and software and sensors, wherein said second sensor is comprised by an additional Internet of things device of said plurality of Internet of things devices;
   determining, by said processor, that said first sensor and said second sensor comprise similar sensor types and are associated with similar performance levels;
   connecting, by said processor, said second sensor to said Internet of things device;
   enabling, by said processor, said second sensor such that said second sensor operationally replaces said first sensor;
   executing, by said processor, a command signal for assigning a specified hardware and software resource or sensor, of said additional available hardware and software resources and sensors, to said Internet of things device;
   retrieving, by said processor, a network identification code associated with a location of said specified hardware and software resource or sensor; and
   enabling, by said processor via said network identification code, said specified hardware and software resource or sensor with respect to said Internet of things device.

2. The method of claim 1, wherein said enabling said specified hardware and software resource or sensor comprises:
   executing software code for automatically assigning said specified hardware and software resource or sensor to said Internet of things device.

3. The method of claim 1, wherein said enabling said specified hardware and software resource or sensor comprises:
   comparing a performance level of the hardware and software resources and sensors associated with hardware and software operations executed by said Internet of things device to a current operational performance level of additional hardware and software resources and sensors available on said network;
   determining, based on results of said comparing, that a hardware and software resource or sensor of said additional hardware and software resources and sensors available on said network comprises a performance level exceeding each said performance level associated with each of said hardware and software resources and sensors; and
   triggering an alert indicating said performance level exceeding each said performance level associated with each of said hardware and software resources and sensors.

4. The method of claim 3, wherein said automatically assigning said specified hardware and software resource or sensor to said Internet of things device comprises:
   executing, by said processor, software code for automatically assigning additional hardware and software resources and sensors to said Internet of things device.

5. The method of claim 1, wherein said identifying hardware and software resources and sensors associated with hardware and software operations executed by said Internet of things device comprises;
   pinging said hardware and software resources and sensors; and
   receiving a response to said pinging.

6. The method of claim 1, further comprising:
   encrypting, by said processor, said network identification code.

7. The method of claim 1, further comprising:
   determining, by said processor, that said additional hardware and software resources and said additional sensors are operational with respect to a specified threshold.

8. The method of claim 1, further comprising:
   providing at least one support service for at least one of creating, integrating, hosting, maintaining, and deploying computer-readable code in the control hardware, said code being executed by the computer processor to implement: said detecting, said registering, said identifying said hardware and software resources and sensors, said identifying said performance level, said storing, said displaying, said executing, said retrieving, and said enabling.

9. A computer program product, comprising a computer readable hardware storage device storing a computer readable program code, said computer readable program code comprising an algorithm that when executed by a processor of a hardware device implements a shared hardware and software resource improvement method, said method comprising:

detecting, by said processor executing a network registration circuit, an Internet of things device connected to a network;

registering, by said processor, said Internet of things device with said network;

identifying, by said processor, hardware and software resources and sensors associated with hardware and software operations executed by said Internet of things device;

identifying, by said processor, a performance level associated with each of said hardware and software resources and sensors;

storing, by said processor within a database, all available data and associated metadata associated with said hardware and software resources and said sensors;

detecting, by said processor, an error associated with operation of a first sensor of said hardware and software resources and said sensors, wherein said first sensor is comprised by said Internet of things device;

displaying, by said processor via a graphical user interface, additional available hardware and software and sensors associated with a plurality of Internet of things devices connected to said network;

selecting in response to said detecting, by said processor from said graphical user interface, a second sensor of said additional available hardware and software and sensors, wherein said second sensor is comprised by an additional Internet of things device of said plurality of Internet of things devices;

determining, by said processor, that said first sensor and said second sensor comprise similar sensor types and are associated with similar performance levels;

connecting, by said processor, said second sensor to said Internet of things device;

enabling, by said processor, said second sensor such that said second sensor operationally replaces said first sensor;

executing, by said processor, a command signal for assigning a specified hardware and software resource or sensor, of said additional available hardware and software resources and sensors, to said Internet of things device;

retrieving, by said processor, a network identification code associated with a location of said specified hardware and software resource or sensor; and enabling, by said processor via said network identification code, said specified hardware and software resource or sensor with respect to said Internet of things device.

10. The computer program product of claim 9, wherein said enabling said specified hardware and software resource or sensor comprises:

executing software code for automatically assigning said specified hardware and software resource or sensor to said Internet of things device.

11. The computer program product of claim 9, wherein said enabling said specified hardware and software resource or sensor comprises:

comparing a performance level of the hardware and software resources and sensors associated with hardware and software operations executed by said Internet of things device to a current operational performance level of additional hardware and software resources and sensors available on said network;

determining, based on results of said comparing, that a hardware and software resource or sensor of said additional hardware and software resources and sensors available on said network comprises a performance level exceeding each said performance level associated with each of said hardware and software resources and sensors; and triggering an alert indicating said performance level exceeding each said performance level associated with each of said hardware and software resources and sensors.

12. The computer program product of claim 11, wherein said automatically assigning said specified hardware and software resource or sensor to said Internet of things device comprises:

executing, by said processor, software code for automatically assigning additional hardware and software resources and sensors to said Internet of things device.

13. The computer program product of claim 9, wherein said identifying hardware and software resources and sensors associated with hardware and software operations executed by said Internet of things device comprises;

pinging said hardware and software resources and sensors; and receiving a response to said pinging.

\* \* \* \* \*